United States Patent
Johansson et al.

(10) Patent No.: US 9,631,568 B2
(45) Date of Patent: Apr. 25, 2017

(54) METHOD FOR MONITORING OPERATIONAL PARAMETERS IN AN INTERNAL COMBUSTION ENGINE

(71) Applicant: SCANIA CV AB, Södertälje (SE)

(72) Inventors: Björn Johansson, Johanneshov (SE); Magnus Pettersson, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/895,806

(22) PCT Filed: Jun. 9, 2014

(86) PCT No.: PCT/SE2014/050687
§ 371 (c)(1),
(2) Date: Dec. 3, 2015

(87) PCT Pub. No.: WO2014/200421
PCT Pub. Date: Dec. 18, 2014

(65) Prior Publication Data
US 2016/0102626 A1    Apr. 14, 2016

(30) Foreign Application Priority Data
Jun. 10, 2013    (SE) ...................................... 1350706

(51) Int. Cl.
*F02D 41/24*        (2006.01)
*G01M 15/05*        (2006.01)
(Continued)

(52) U.S. Cl.
CPC .......... *F02D 41/248* (2013.01); *F02B 77/085* (2013.01); *F02D 41/22* (2013.01);
(Continued)

(58) Field of Classification Search
CPC ...... F02D 41/1448; F02D 41/18; F02D 41/22; F02D 41/24; F02D 41/248;
(Continued)

(56) References Cited

U.S. PATENT DOCUMENTS 6,189,523 B1 * 2/2001 Weisbrod .............. F02D 31/002
                                                          123/27 GE
6,334,085 B1   12/2001 Kawamura et al.
(Continued)

FOREIGN PATENT DOCUMENTS

WO    WO 2010/073111 A1    7/2010

OTHER PUBLICATIONS

International Search Report dated Nov. 3, 2014 issued in corresponding International patent application No. PCT/SE2014/050687.

*Primary Examiner* — John Kwon
*Assistant Examiner* — Johnny H Hoang
(74) *Attorney, Agent, or Firm* — Ostrolenk Faber LLP

(57) ABSTRACT

A method to monitor an operating characteristic in a combustion engine: creating a monitoring matrix divided into a number of sections for storage of information, wherein each section is associated with specific intervals of engine speed $\omega$ and torque requested from the engine $T_1$. When the engine is used during an operational time window with a predetermined duration, measuring or estimating an operating characteristic and associating the characteristic with the monitoring matrix's respective section, associated with the current engine speed and the torque requested. For each section in the monitoring matrix, calculating at least one statistical parameter describing the operating characteristic associated with this section during the current operational time window; storing the statistical parameter(s) in the respective section. At the end of the operational time window, storing information in the monitoring matrix in an
(Continued)

individual storage matrix associated with the operational time window, wherein the monitoring matrix is emptied of information.

20 Claims, 2 Drawing Sheets

(51) Int. Cl.
    *F02B 77/08*     (2006.01)
    *F02D 41/22*     (2006.01)
    *F02D 41/26*     (2006.01)
    *F02D 41/14*     (2006.01)
    *F02D 41/18*     (2006.01)
(52) U.S. Cl.
    CPC ..... *F02D 41/2409* (2013.01); *F02D 41/2422* (2013.01); *F02D 41/2432* (2013.01); *F02D 41/26* (2013.01); *G01M 15/05* (2013.01); *F02D 41/1448* (2013.01); *F02D 41/18* (2013.01); *F02D 2041/228* (2013.01); *F02D 2200/021* (2013.01); *F02D 2200/0404* (2013.01); *F02D 2200/0406* (2013.01); *F02D 2200/0602* (2013.01); *F02D 2200/0625* (2013.01); *F02D 2200/0802* (2013.01); *F02D 2200/1002* (2013.01); *Y02T 10/40* (2013.01)

(58) Field of Classification Search
    CPC ............. F02D 41/2409; F02D 41/2422; F02D 41/2432; F02D 41/26; F02D 2200/021; F02D 2200/0802; F02D 2200/1002; F02B 77/085; G01M 15/05; Y02T 10/40
    USPC ................................. 701/102, 106, 110–115
    See application file for complete search history.

(56) References Cited

U.S. PATENT DOCUMENTS

| | | | |
|---|---|---|---|
| 6,876,918 B2 | 4/2005 | Kabe et al. | |
| 7,424,362 B2* | 9/2008 | Konrad | F02D 41/1402 701/102 |
| 8,489,272 B2* | 7/2013 | Sano | B60R 16/0232 180/54.1 |
| 2006/0106526 A1 | 5/2006 | Sugita et al. | |
| 2008/0162012 A1* | 7/2008 | Masuda | F02D 11/105 701/101 |
| 2008/0262712 A1* | 10/2008 | Duty | B60W 10/02 701/123 |
| 2010/0228462 A1* | 9/2010 | Verdejo | F02D 41/022 701/102 |
| 2012/0310505 A1* | 12/2012 | Morgan | F02D 35/024 701/102 |

* cited by examiner

METHOD FOR MONITORING OPERATIONAL PARAMETERS IN AN INTERNAL COMBUSTION ENGINE

CROSS-REFERENCE TO RELATED APPLICATIONS

The present application is a 35 U.S.C. §§371 national phase conversion of PCT/SE2014/050687, filed Jun. 9, 2014, which claims priority of Swedish Patent Application No. 1350706-6, filed Jun. 10, 2013, the contents of which are incorporated by reference herein. The PCT International Application was published in the English language.

FIELD OF THE INVENTION

The present invention pertains to a method for monitoring of operating characteristics in combustion engines. The invention is particularly, but not exclusively, focused on the performance of such a method in motor vehicles in the form of wheeled commercial vehicles, especially heavy goods vehicles, such as trucks, tractors and buses.

BACKGROUND TECHNOLOGY

For several reasons, it is interesting to know how a combustion engine behaves over time. One reason may be that one wants to monitor in which engine speed area the engine has been operating and which torque has been requested from it, for example to predict when the engine needs to be serviced or to predict the total service life of the engine.

U.S. Pat. No. 6,334,085 describes a device for data processing which is used to keep a track on how long the engine has been operating with different loads and engine speed, and based on this information, for example, to estimate the engine's service life. As a measure of the load, a difference between engine speed under load and no load speed is used, and a matrix is created with different sections for storage of information. Each section is associated with specific intervals of values for the above mentioned difference and for the engine's engine speed with no load. The time which the engine spends in a certain section is logged in the matrix.

Other aspects of a combustion engine's behavior over time may, however, also be interesting to be aware of, for example in order to detect differences from the expected behavior. In particular, this applies to the torque generated by the engine, which should not change over time in relation to the torque requested from the engine. If the generated torque over time begins to differ from the requested torque, this means that the combustion engine is not functioning as intended, which may be a sign that it needs to be repaired or serviced. For example, the generated torque may decrease in relation to the requested torque if the fuel injectors are clogged and need to be cleaned.

Also, with respect to other operating characteristics such as charge air pressure, exhaust back pressure, mass flow, fuel pressure, fuel consumption, engine temperature, catalyst temperature, auxiliaries engagement rates, turbine speed, throttle position etc., it may be important to know that these do not change over time and begin to differ from expectations. Several of these operating characteristics are difficult and/or expensive to measure exactly, and it is therefore of interest to find a way of detecting differences from expectations without having to measure the actual values.

WO2010/073111 describes a method to monitor the fuel consumption in a combustion engine. The fuel consumption is measured and associated with the engine's engine speed and torque at the actual measuring time. The measuring value is saved in a matrix, which at predetermined points in time is updated by having the most recently measured fuel consumption value saved in association with the current engine speed and torque, or by an average of a number of measured values for the fuel consumption at the current engine speed and torque being saved in the matrix. The matrix is thus continuously updated, since the most recently obtained value relating to fuel consumption replaces a previously saved value. This method may therefore not be used to determine how the fuel consumption has varied over time.

SUMMARY OF THE INVENTION

The objective of the present invention is to present a method for monitoring of operating characteristics in combustion engines which are helpful in detecting differences from an expected behavior in the combustion engine. This objective is achieved according to the invention by providing a method to monitor and store information about an operating characteristic in a combustion engine, which comprises the steps:

a) creating a monitoring matrix divided into several sections for storage of information on a data storage medium, where each section is associated with specific intervals of values for the reference engine characteristics of the combustion engine, which reference engine characteristics comprise engine speed $\omega$ and the torque requested from the engine $T_1$, b) where the engine is used during an operational time window with a predetermined duration, detecting the reference engine characteristics and estimating or measuring an operating characteristic on several occasions, where each estimated or measured value for the operating characteristic is associated with the monitoring matrix's respective section associated with the values of the reference engine characteristics at the respective said occasions, c) for each section in the monitoring matrix, calculating at least one statistical parameter describing the estimated or measured values of the operating characteristic associated with this section during the current operational time window, and storing the at least one calculated statistical parameter in the respective section, d) at the end of the operating time window, storing information in the monitoring matrix in an individual storage matrix associated with the operational time window, wherein the monitoring matrix is emptied of information.

With the method according to the invention, it is possible to save a time series of values representing a certain operational characteristic, at specific values of engine speeds and torque requested from the engine. In this manner, it is possible to see in retrospect how an operating characteristic has developed over time and to determine whether a difference in the operating characteristic from the expected has occurred, and, in this case, at which engine speeds and at which requested torques this difference has occurred. For example, it is possible to detect in retrospect whether a difference has occurred at only high engine speeds and, if so, at which requested torques, or whether the difference is constant across the entire engine speed range. The method makes possible detection of a diverging behavior in an operating characteristic of the combustion engine without having to measure the actual operating characteristic in a garage, since the mechanic may easily access the storage matrix or matrices where data is stored. The values stored in the storage matrix or storage matrices may then be compared with reference values of this relevant operating characteristic, in order to see whether and how much the monitored operating characteristic differs from expectations. In this manner, troubleshooting of the combustion engine is facilitated.

According to one embodiment, the estimated or measured operating characteristic is selected from among the combustion engine's charging pressure, exhaust back pressure, mass air flow, fuel pressure, fuel consumption, engine temperature, catalyst temperature, auxiliaries engagement rates, turbine speed, throttle position or the torque generated by the combustion engine. Monitoring the torque generated by the combustion engine is of special interest.

According to another embodiment, step b above is carried out through estimation or measurement of a first operating characteristic, wherein the first operating characteristic is selected so that a relevant second operating characteristic for the respective section may be described as a function of the estimated or measured first operating characteristic and one of the section's reference engine characteristics, preferably the engine's engine speed. In this manner, one may select to estimate or measure as a first operating characteristic, a characteristic which is cheap to produce in terms of calculation or easy to measure. For example, one may choose to make a simple and approximate estimation. Since a relevant second operating characteristic may be described as a function of the estimated operating characteristic, by seeing how the first operating characteristic is changing over time, one may draw conclusions about how the relevant second operating characteristic changes over time, without having to produce an exact expression for this second operating characteristic. This is interesting for several operating characteristics, which are relatively expensive or difficult to measure.

According to one specific variant of this embodiment, the first operating characteristic is selected so that the torque $T_2$ generated by the combustion engine for the respective section may be described as a function of the estimated or measured first operating characteristic and the engine speed $\omega$ of the engine. This is particularly useful since it is relatively costly to estimate the torque generated by the engine. A torque sensor may be mounted in order to monitor the torque generated, but such sensors are generally expensive and rarely or never sufficiently robust for series production. By observing a first, simpler operating characteristic it is therefore possible to save both calculation power and physical space in the engine, since no torque sensor is required. A first operating characteristic may for example consist of a rough estimate of the torque based on engine speed measurements and signal treatment of these. The actual torque may be described as a function of this rough estimate and the engine's speed.

According to one embodiment of the invention, steps b-d above are repeated for at least one operational time window following the relevant operational time window. Thus, a time series may be created, where a number of storage matrices, each of which is associated with a certain operational time window, are saved. At repair or service of the combustion engine, it is possible to access information, for example in a garage, about how the engine has behaved over time, and thus acquire knowledge about when, in which engine speed areas and for which requested torques differences arise. Data may be visualized for the mechanic in order for the latter to easily form an opinion about the engine's behaviour.

According to another embodiment, the method comprises the steps:
e) comparing information stored in a first comparison matrix, consisting of one of the storage matrices or the monitoring matrix, with information stored in a first reference matrix with a corresponding division into sections, and forming a first test variable t1, for the respective pairs of sections,
f) for the respective pairs of sections, testing the first test variable t1 against a storage criterion, wherein the information stored in the first comparison matrix is saved only if the storage criterion is met. In this case, a storage criterion may be selected so that information from a certain operational time window is saved only if it differs sufficiently from information from, for example, a previous operational time window. If the storage criterion is not met, data from the relevant operational time window may be thrown away. With this method, storage space may be saved, since only data from the operational time windows where a difference has occurred is saved in a storage matrix. The length of the operational time window may thus also be reduced, which gives a better time resolution of stored information.

According to one embodiment, the first test variable t1 is formed for the respective pairs of sections by calculating the difference between a statistical parameter stored in the first comparison matrix and a value stored in the first reference matrix. This is a simple way of forming the test variable t1.

Another embodiment of the invention comprises the method steps:
g) comparing information stored in a second comparison matrix, which consist of one of the storage matrices or the monitoring matrix, with information stored in a second reference matrix with a corresponding division into sections, and forming a second test variable t2 for the respective pairs of sections,
h) testing of the second test variable t2 against an alarm criterion for the respective pairs of sections, and if that the alarm criterion is met,
i) generating an error code.

Through these additional steps, an error code is generated if the combustion engine's monitored operating characteristic differs from expectations. For a combustion engine in a vehicle, this may result in the vehicle's driver receiving an error message and thus taking the vehicle to a garage for service.

According to one embodiment, for the respective pairs of sections, the second test variable t2 is formed by calculating the difference between a statistical parameter stored in the second comparison matrix and a value stored in the second reference matrix. This is a simple way of forming the test variable t2.

According to another embodiment, the storage criterion and/or the alarm criterion is met if the first test variable t1 and the second test variable t2 for at least one of the pairs of sections exceed a predetermined threshold value for the respective pair. The threshold value may thus be adapted according to the respective pairs of sections, so that greater differences may be required in certain engine speed areas and for certain requested torques than for others, in order for the storage criterion and/or the alarm criterion to be deemed met. It is also possible to adapt the number of pairs of sections that must exceed their respective threshold value in order for the criteria to be met. Naturally, different threshold values may be set for the storage criterion and the alarm criterion, respectively. For example, it may be interesting to store information even if this differs only a little from the data in the relevant reference matrix, while an error code is generated only if data differs markedly.

According to another embodiment, one of the storage matrices associated with a previous operational time window is used as at least one reference matrix. Preferably, the storage matrix in which data from an operational time window has been stored for the longest period of time is used as at least one reference matrix. The reference matrix may then be the storage matrix in which data has been stored during an operational time window directly after manufacture or repair, when the engine's operating characteristic has been verified by way of measurement. In this manner, a reliable reference matrix with which to compare data is obtained. A matrix created with the help of a reference engine or a development engine of the same type, where the operating characteristics which the engine generates are known, may also be used as a reference matrix. The reference matrix may also be created theoretically, e.g. through simulation with the help of a calculation model.

According to another embodiment, the storage matrix associated with the most recent operational time window is used as at least one comparison matrix. By using the most recently saved storage matrix instead of the monitoring matrix, the method becomes more robust. Since the values for statistical parameters which are saved in the storage matrices are fixed values which do not vary over time, the generation of error codes due to individual extreme values, or to a difference during only a small part of an operational time window, is avoided.

According to another embodiment, in step d, information about the operational time window, during which the at least one statistical parameter is calculated, is stored jointly with the information from the monitoring matrix. This embodiment is particularly interesting in cases where a storage criterion has been set up to determine whether or not information from a certain operational time window should be saved in a storage matrix. Since in these cases only data from certain operational time windows is stored, it becomes interesting to know, for example, the length of the operational time window and the time of the operational time window's start and finish.

According to one embodiment, at least two statistical parameters are calculated for each section. According to one embodiment, the statistical parameters comprise, according to one embodiment, mean and/or median and/or variance and/or standard deviation. With these parameters, a good measure of data distribution within each section is obtained.

According to one embodiment, the calculation of at least one statistical parameter occurs recursively during the operational time window. Its advantage is that the storage space required is smaller than if the statistical parameters are calculated after the operational time window's end, based on values stored in the monitoring matrix.

According to one embodiment, the operational time window's duration is between 20 hours and 3000 hours, preferably between 50 hours and 1000 hours and more preferably between 200 and 500 hours. The operational time window's duration is optimized in such a way that a not too great number of storage matrices are required to store data between service opportunities for the engine, so that a large number of values may be collected in order to achieve statistical reliability within each operational time window, and so that the time resolution of a time series of storage matrices becomes acceptable/suitable.

According to another aspect of the invention, the objective is achieved with a computer program which may be downloaded to an internal memory of a computer, comprising software to control the steps according to the method suggested above, when said program is executed on a computer.

According to another aspect of the invention, the objective is achieved with a computer program product comprising a data storage medium which is readable by a computer, the computer program code of a computer program according to the above being stored on the data storage medium.

According to another aspect of the invention, the objective is achieved through an electronic control device comprising an execution means, a memory connected to the execution means and a data storage medium connected to the execution means, the computer program code in a computer program according to the above being stored on said data storage medium.

According to another aspect of the invention, the objective is achieved through a motor vehicle comprising an electronic control device according to the above.

Other advantageous features of the invention and advantages of the latter are set out in the description below.

BRIEF DESCRIPTION OF THE DRAWINGS

The invention is described below with the help of example embodiments, with reference to the enclosed drawings, where.

DETAILED DESCRIPTION OF EMBODIMENTS ACCORDING TO THE INVENTION

The term operational time window as used herein means a time period during which a combustion engine is in operation. If the combustion engine stands unused during a certain time period, such period of time is not included in the operational time window.

Figure 1:
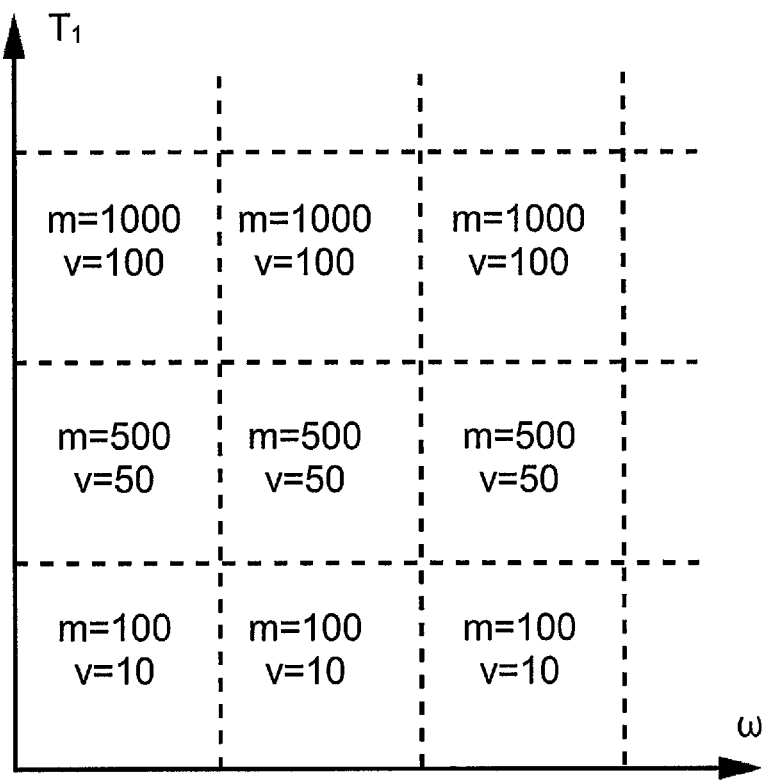
FIG. 1 shows a schematic sketch of a matrix which is used in a method according to the invention.

In a method according to the invention, a monitoring matrix is first created, and divided into several sections for storage of information. Such a matrix is displayed schematically in FIG. 1. Each section in the monitoring matrix is associated with specific intervals of values of engine speeds w, here displayed on the x-axis, and of torque $T_1$ requested from the engine, here displayed on the y-axis.

When the engine is used during an operational time window of a determined duration, an operating characteristic is estimated or measured at a number of occasions. In the embodiment described herein, an operating characteristic is estimated, here called torque estimate $T_{est}$, which is selected to monitor whether and how the torque generated by the engine changes over time. In this embodiment the torque $T_2$ actually generated by the combustion engine may be described as a function of the torque estimate $T_{est}$ and the engine's engine speed ω, that is to say $T_2=f(T_{est},\omega)$. The actually generated torque $T_2$ thus does not need to be in direct proportion to the torque estimate $T_{est}$. At each estimate, a certain engine speed ω prevails as well as a certain torque $T_1$ requested from the engine. The engine speed ω and the requested torque $T_1$ are measured at the moment of estimation, and the value obtained for the torque estimate $T_{est}$ is directly tied to the section of the monitoring matrix associated with the relevant values for engine speed ω and the torque $T_1$ requested from the engine. The torque estimate $T_{est}$ is the basis for a calculation of a number of statistical parameters that describe the torque estimates for the respective section in the monitoring matrix, in the here displayed embodiment mean $m(T_{est})$ and variance $v(T_{est})$. These statistical parameters are stored in the monitoring matrix, as schematically displayed in FIG. 1. The calculation of statistical parameters occurs in this case with the help of recursive algorithms, so that the values change successively during the duration of the operational time window.

Figure 2A:
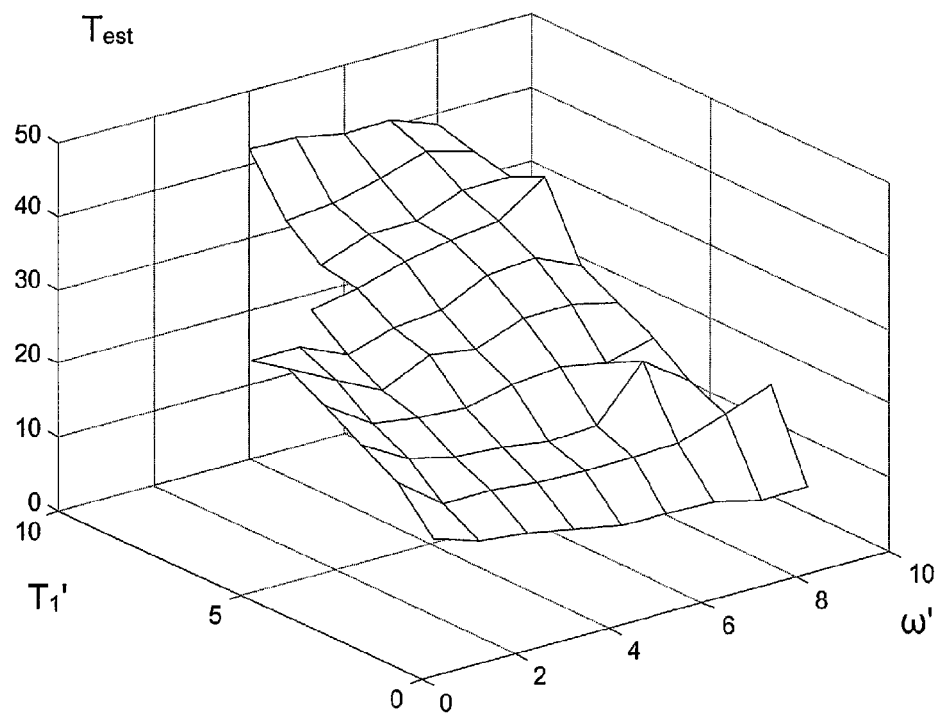
FIG. 2a-b shows visualizations of storage matrices for a first and a second operational time window which is achieved according to the invention.
Figure 2B:
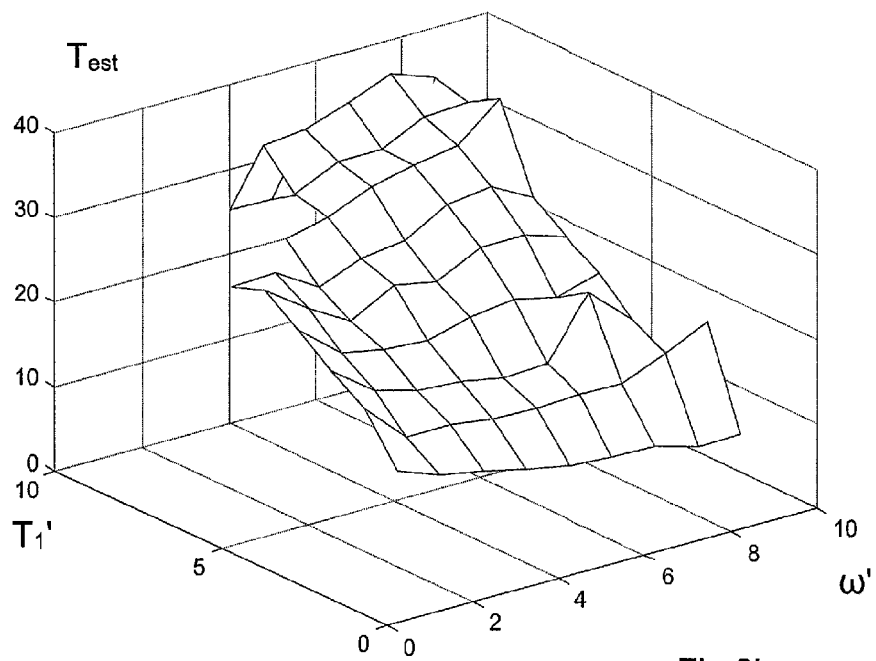

At the end of the operational time window, the information from the monitoring matrix is stored in an individual storage matrix, associated with the operational time window with a similar division into sections. The monitoring matrix is then emptied of information and is used for storage of new information during a following operational time window. A time series of storage matrices is created. FIG. 2a shows an example of a visualised storage matrix from a first operational time window, divided into ten times ten sections, where the torque estimate $T_{est}$ has been plotted against normalized requested torque $T_1'$ and normalized engine speed ω'. FIG. 2b shows a similar storage matrix for a second, later operational time window. By comparing both the storage matrices, it may be seen that the torque estimate for high requested torque at the later operational time window differs from the torque estimate which is estimated at the first operational time window.

According to the embodiment described herein, information stored during the later operational time window is compared with information stored during the first operational time window, wherein the storage matrix displayed in FIG. 2a forms a reference matrix. The reference matrix is created here directly after manufacture of the engine, when the engine's generated torque has been verified, whereupon during said first operational time window the torque estimate $T_{est}$ has been estimated.

By comparing the matrices, a test variable t2 is formed, corresponding to the difference between the mean values stored in the storage matrix displayed in FIG. 2b and corresponding to the mean values stored in the reference matrix displayed in FIG. 2a. In case the test variable t2 exceeds a predetermined threshold value, an alarm criterion is met and an error code is generated. In the case shown in FIG. 2a-b, the alarm criterion is met for high values of a requested torque. When the error code is generated, a signal is provided, in this case to the driver of the motor vehicle which is driven by the engine, that it is time to go to repair or connection station such as a garage. A mechanic may then read the data storage medium where the storage matrices are stored, and thus the troubleshooting of the engine is facilitated.

In the above described embodiment, a torque estimate $T_{est}$ is used which may be produced in different ways. For example, with the help of signal treatment of engine speed measurements it is possible to obtain a simple torque estimate, which may easily be used in the method according to the invention, since a change of this torque estimate over time reveals a change also in the actually generated torque.

The calculation of statistical parameters may be made either recursively as described above, or after the end of the operational time window. The later variant, however, requires more storage space, since individually measured or estimated values must be saved during the entire operational time window. If there is enough storage space and a lot of information is sought, a histogram may be saved for each section.

In the above described embodiment, information from each operational time window is stored in a storage matrix, but in order to save storage space it is also possible to select saving only data from certain time windows. This may occur in different ways. One way is to set up a storage criterion for which data is to be saved, and to compare data either from the monitoring matrix or from the most recently saved storage matrix with data stored in, for example, the above mentioned reference matrix or in another reference matrix. Through the comparison between matrices, a test variable t1 is formed, corresponding to the difference between, e.g. the mean values or the median values stored in the monitoring matrix or the storage matrix, and corresponding values stored in the reference matrix. In case the test variable t1 exceeds a predetermined threshold value, a storage criterion is met, and data from the operational time window is saved in a storage matrix. In cases where only data from certain operational time windows is saved, it is interesting to simultaneously save information about the time window when data was collected.

The operational time window's duration may for example be set at between 20 hours and 3000 hours. Typical values for the duration of the operational time window may be between 50 hours and 1000 hours, depending on the engine's area of use, on the available storage space and on the operating characteristic being monitored. For an engine in a heavy goods vehicle where there is a desire to detect faults in the torque generated by the engine, an operational time window of between 200 and 500 hours may be suitable. The operational time window's duration may be selected to be shorter, for example in the cases where only data from certain operational time windows is stored in storage matrices.

The storage, monitoring and reference matrices are suitably divided into ten sections for engine sped and requested torque, respectively, preferably 10-20 sections. The number of sections is selected, for example, according to the available storage space. The more sections, the better resolution is obtained at the detection of differences However, the matrices then require more storage space.

The reference matrix need not be a storage matrix, created during an earlier operational time window for the same engine which is being monitored. The reference matrix may also be created with the help of a reference engine or a development engine of the same type, where the operating characteristics which the engine generates may be verified or known. The reference matrix may also be created theoretically, e.g. through simulation with the help of a calculation model.

Engine speed is detected, suitably with the help of an engine speed sensor, placed at an output shaft in the combustion engine or at the engine's flywheel. The torque requested from the engine may be directly available as an internal signal in the engine's control device.

A computer program code for the implementation of a method according to the invention is suitably included in a computer program, loadable into the internal memory of a computer, such as the internal memory of an electronic control device of a motor vehicle. Such a computer program is suitably provided via a computer program product comprising a data storage medium readable by an electronic control device, the data storage medium having the computer program stored thereon. Said data storage medium is e.g. an optical data storage medium in the form of a CD-ROM, a DVD, etc., a magnetic data storage medium in the form of a hard disk drive, a floppy disc, a cassette, etc., or a Flash memory or a ROM, PROM, EPROM or EEPROM type memory.

Figure 3:
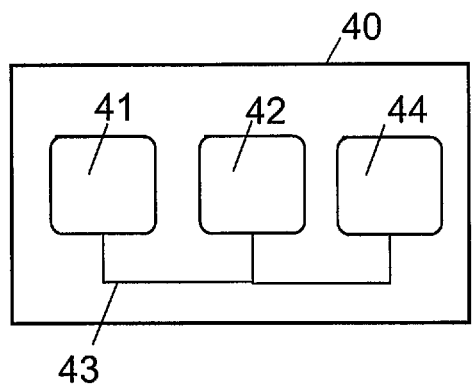
FIG. 3 is a schematic diagram of a control device for implementation of a method according to the invention.

FIG. 3 illustrates schematically an electronic control device 40 comprising execution means 41, such as a central processor unit (CPU), for the execution of a computer software. The execution means 41 communicates with a memory 42, e.g. a RAM memory, via a data bus 43. The control device 40 also comprises a data storage medium 44, e.g. in the form of a Flash memory or a ROM, PROM, EPROM or EEPROM type memory. The execution means 41 communicates with the data storage means 44 via the data bus 43. A computer program comprising computer program code for the implementation of a method according to the invention is stored on the data storage medium 44.

The invention is not limited in any way to the embodiments described above, but numerous possible modifications thereof should be obvious to a person skilled in the area, without such person departing from the spirit of the invention as defined by the appended claims.

The invention claimed is:

1. A method to monitor and store information about an operating characteristic in a combustion engine, comprising the steps:
    a) creating a monitoring matrix divided into several sections for storage of information on a data storage medium, wherein each section is associated with specific intervals of values for reference engine characteristics of the combustion engine, wherein the reference engine characteristics comprise engine speed $\omega$ and torque requested from the engine $T_1$;
    b) using the engine during an operational time window of a predetermined duration, detecting the reference engine characteristics during the time window, and estimating or measuring an operating characteristic on several occasions, and associating each estimated or measured value for the operating characteristic with the monitoring matrix's respective section, associated with values of the reference engine characteristics at the respective occasions;
    c) for each section in the monitoring matrix, calculating at least one statistical parameter describing the estimated or measured values of the operating characteristic associated with this section during the current operational time window, and storing the at least one calculated statistical parameter in the respective section; and
    d) at the end of the operational time window, storing information, which had been stored in the monitoring matrix, in an individual storage matrix associated with the operational time window, and emptying the monitoring matrix of information.

2. A method according to claim 1, further comprising selecting the estimated or measured operating characteristic from among the combustion engine's charge pressure, exhaust back pressure, air mass flow, fuel pressure, fuel consumption, engine temperature, catalyst temperature, auxiliaries connection degree, turbine speed, throttle position, or by the torque generated by the combustion engine.

3. A method according to claim 1, further comprising carrying out step b) through estimating or measuring of a first operating characteristic, wherein the first operating characteristic is selected so that a relevant second operating characteristic for the respective section may be described as a function of the estimated or measured first operating characteristic and one of the section's reference engine characteristics.

4. A method according to claim 3, further comprising selecting the first operating characteristic so that the torque $T_2$ generated by the combustion engine may be described for the respective section as a function of the estimated or measured first operating characteristic and of the section's reference characteristic of engine's engine speed $\omega$.

5. A method according to claim 1, further comprising repeating steps b)-d) for at least one operational time window following after a relevant operational time window.

6. A method according to claim 5, further comprising the following steps:
    e) comparing information stored in a first comparison matrix, which is comprised of one of the storage matrices or the monitoring matrix, with information stored in a first reference matrix with a corresponding division into sections, forming a first test variable t1 for the respective pairs of sections; and
    f) for the respective pairs of sections, testing of the first test variable t1 against a storage criterion, wherein the information stored in the first comparison matrix is saved only if the storage criterion is met.

7. A method according to claim 6, further comprising forming the first test variable t1 for the respective pairs of sections by calculating the difference between a statistical parameter stored in the first comparison matrix and a value stored in the first reference matrix.

8. A method according to claim 6, further comprising the following steps:
    g) comparing information stored in a second comparison matrix, wherein the second comparison matrix comprises one of the storage matrices or the monitoring matrix, with information stored in a second reference matrix with a corresponding division into sections, and forming a second test variable t2 for the respective pairs of sections;
    h) for the respective pairs of sections, testing the second test variable t2 against an alarm criterion and, if that the alarm criterion is met,
    i) generating an error code.

9. A method according to claim 8, further comprising for the respective pairs of sections, forming the second test variable t2 by calculating the difference between a statistical parameter stored in the second comparison matrix and a value stored in the second reference matrix.

10. A method according to claim 8, further comprising determining that the storage criterion and/or the alarm criterion is met if the first test variable t1 and the second test variable t2, respectively, for at least one of the pairs of sections, exceeds a predetermined threshold value for the respective pair.

11. A method according to claim 6, further comprising one of the storage matrices associated with a previous operational time window is used as at least one of the reference matrices.

12. A method according to claim 11, further comprising using the storage matrix, in which data from an operational time window has been stored the longest, as at least one of the reference matrices.

13. A method according to claim 6, further comprising using the storage matrix associated with the most recent operational time window as at least one of the comparison matrices.

14. A method according to claim 1, further comprising in step d), storing information about the operational time window during which the at least one statistical parameter has been calculated together with the information from the monitoring matrix.

15. A method according to claim 1, further comprising calculating at least two of the statistical parameters for each section.

16. A method according to claim 13, wherein the statistical parameters comprise mean and/or median and/or variance and/or standard deviation.

17. A method according to claim 1, further comprising calculating at least one statistical parameter recursively during the operational time window.

18. A computer program product comprising a non-volatile data storage medium which is readable by a computer, a computer program comprising computer code stored on the medium; the computer program code is operable to cause a computer to implement a method according to claim 1, when the computer code is executed in the computer.

19. An electronic control device comprising an execution means, a memory connected to the execution means and a data storage medium connected to the execution means; the computer program code in a computer program according to claim 18 is stored on the data storage medium.

20. A motor vehicle comprising an electronic control device according to claim 19.

* * * * *